May 8, 1962 R. E. LECKNER 3,033,266
STRETCH FORMING MACHINE
Filed July 11, 1958 4 Sheets-Sheet 1
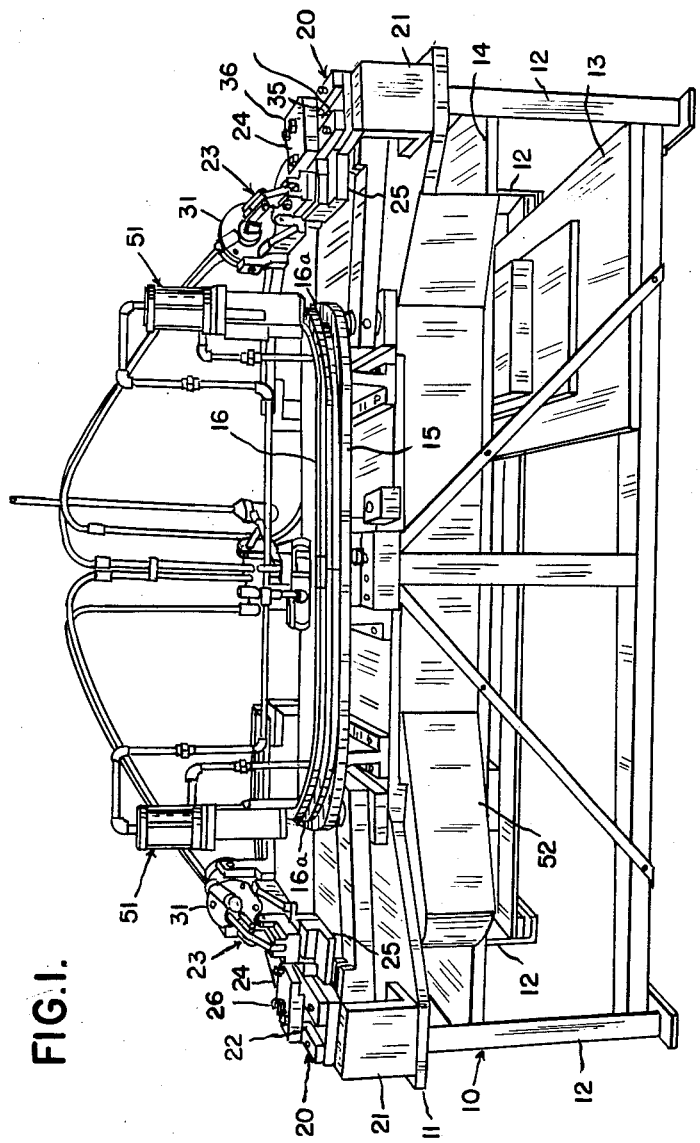
FIG.I.
INVENTOR.
RUSSELL E. LECKNER
BY
ATTORNEYS

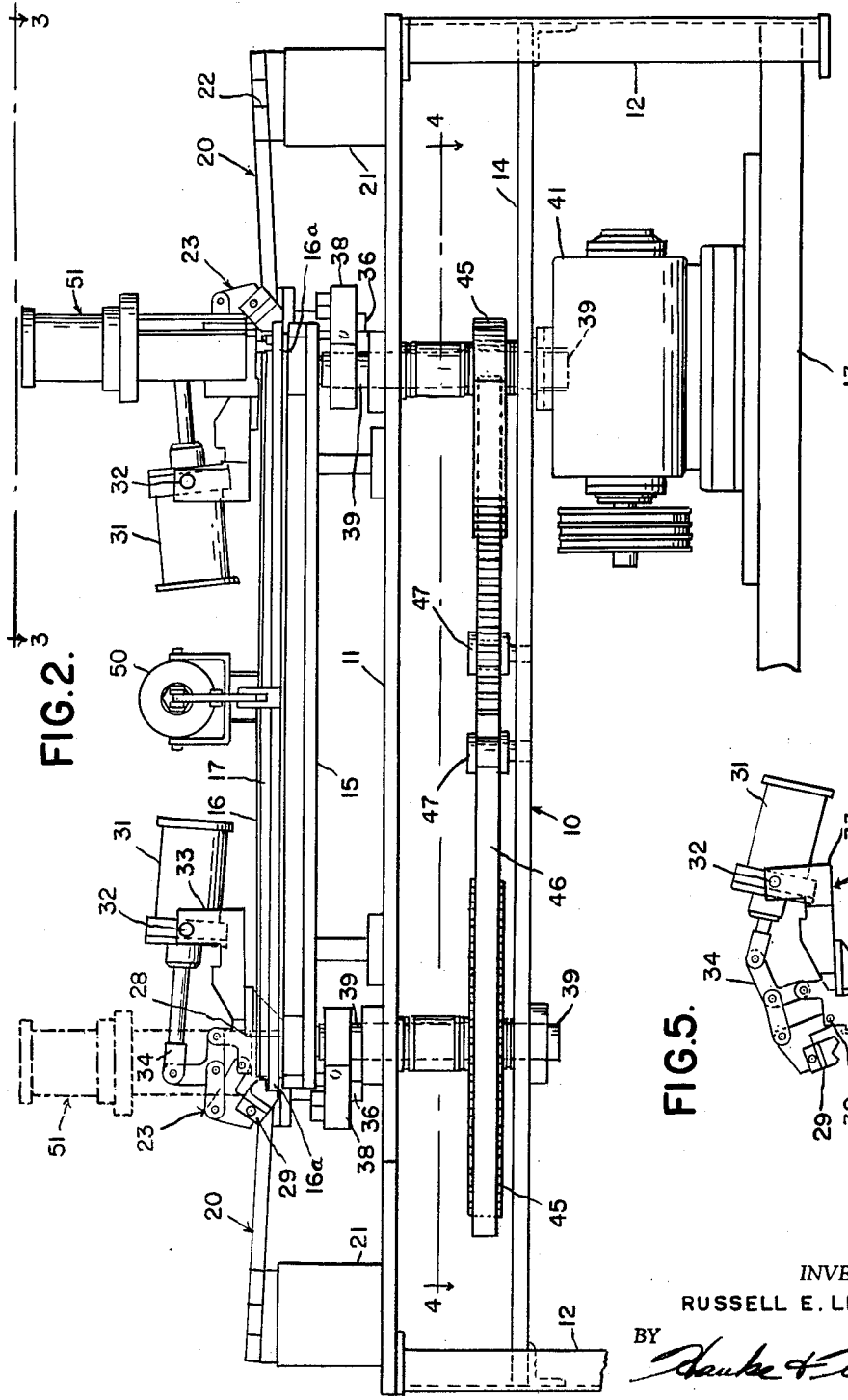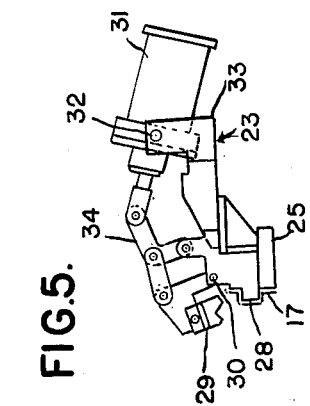

May 8, 1962 R. E. LECKNER 3,033,266
STRETCH FORMING MACHINE
Filed July 11, 1958 4 Sheets-Sheet 3

INVENTOR.
RUSSELL E. LECKNER
BY
ATTORNEYS

INVENTOR.
RUSSELL E. LECKNER
BY
ATTORNEYS

United States Patent Office 3,033,266
Patented May 8, 1962

3,033,266
STRETCH FORMING MACHINE
Russell E. Leckner, 11876 Nashville Drive, Detroit, Mich.
Filed July 11, 1958, Ser. No. 748,082
5 Claims. (Cl. 153—32)

My invention relates to stretch forming machines and more particularly to a simplified and reliable structure operable to stretch-form workpieces around forms having complex contours.

Heretofore, machines for bending materials such as steel trim strip channels and the like have been developed that will produce an accurate bevel in the material in a single plane only, other forming operations being accomplished by using more than one machine, and even then, the complex nature of such machines results in higher costs of finished workpieces, a reduction in reliability of the machines, higher maintenance costs, and the need for highly skilled operators. Most of such machines depend on some type of hydraulic stretching apparatus or other means which produce uniform stretching throughout the entire stretch forming operation. Inasmuch as the stretch actually required generally is not uniform, it is often found that too great a stretch is applied in the initial forming, while too little is applied at the end, resulting in a workpiece that may be weak in parts and/or not sufficiently stretched to eliminate all crimping in other parts.

An object of the present invention is to improve stretch forming apparatus by providing a simplified machine operable to produce any required tension on a workpiece during forming.

Another object of the invention is to improve stretch forming apparatus by providing a simplified structure capable of producing complex bends in a workpiece.

A further object of the invention is to simplify stretch forming machines by constructing a cam contoured relative to the forming around which the workpiece is to be bent and a clamping device which will follow complex cam contours.

A still further object of the invention is to facilitate producing complex contours in a workpiece in stretch forming by providing a clamping device supported solely by the cam structure whose contour the device is forced to follow.

For a more complete understanding of the invention, reference may be had to the accompanying drawings illustrating a preferred embodiment of the invention in which like reference characters refer to like parts throughout the several views and in which FIG. 1 is a perspective front view of a preferred machine embodying the invention illustrating an initial position.

FIG. 2 is a front elevational view of the machine illustrating the position at the end of the bending operation.

FIG. 5 is a fragmentary detail view illustrating the clamping device of the machine in its unlocked open position.

Figure 3:
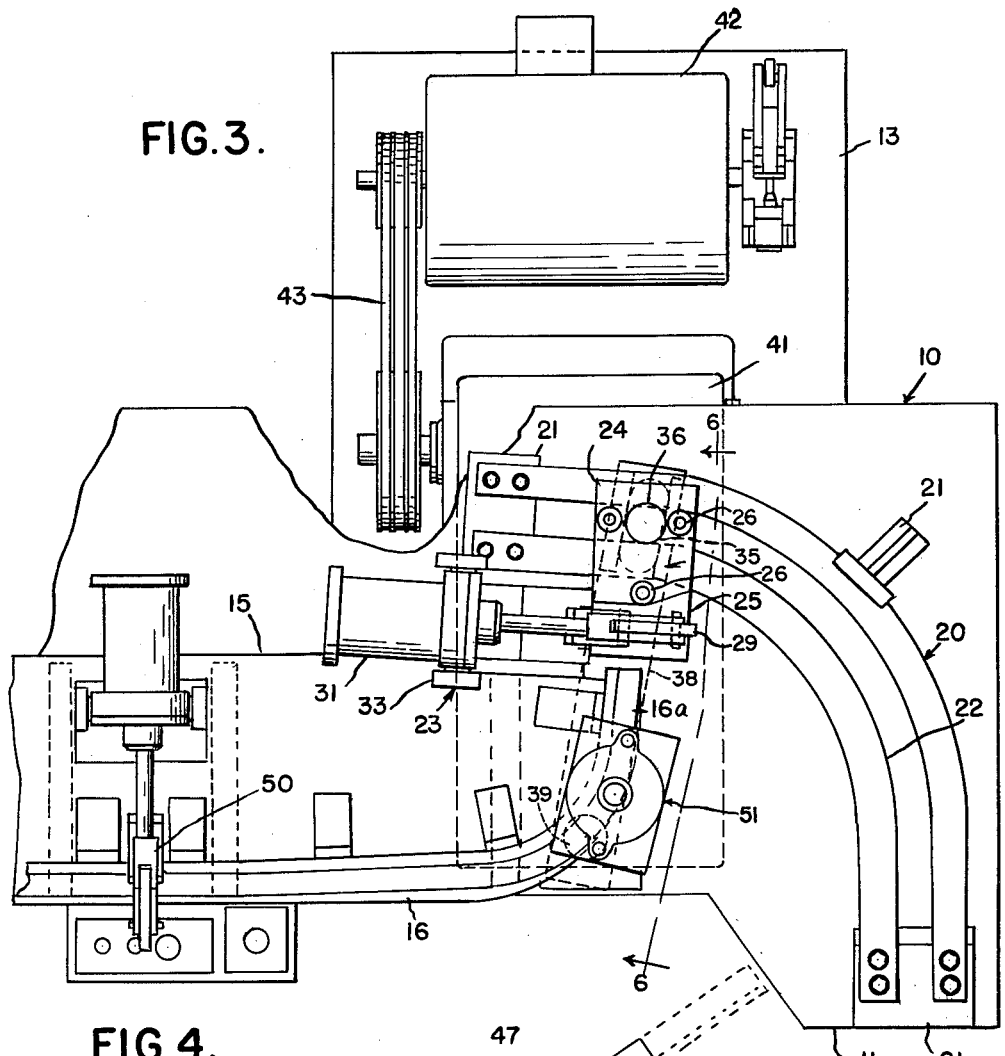
FIG. 3 is a fragmentary top plan view of the machine as seen substantially from the line 3—3 of FIG. 2.

A preferred stretch forming machine 10 is illustrated as comprising a support table 11 having legs 12 and carrying a platform 13, a support frame 14, and a form table 15.

A form 16 is mounted in position on the table 15, and in the present case is provided with convex contour portions 16a at both ends shaped to conform to a channel-like workpiece 17. As will be seen in FIG. 6, the form may also be sloped relative to a horizontal plane as well as being arcuately contoured. It will be apparent that varying curves and slopes may as readily be utilized, as the present invention contemplates forming to a great variety of requirements within reasonable limits.

A pair of track or cam structures 20 are mounted preferably by means of brackets 21 to the table 11, being respectively spaced from the ends of the form 16 as shown. A contoured slot 22 is provided by each structure 20. As seen best in FIG. 2, the cam structures in the present embodiment are sloped to match the slope in the form 16, and it will be noted that other and more complex curves and slopes may be provided within reasonable limits depending on the form used.

A clamping device 23 is supported by and slidably carried on each cam structure 20. The device 23 comprises an upper plate 24 which rides on and follows the upper surface of the cam 20, as best illustrated in FIGS. 3 and 6, a lower plate 25 being disposed beneath the cam 20, secured to and spaced from the upper plate 24 by any means such as bolts 26 and spacers 27.

Figure 6:
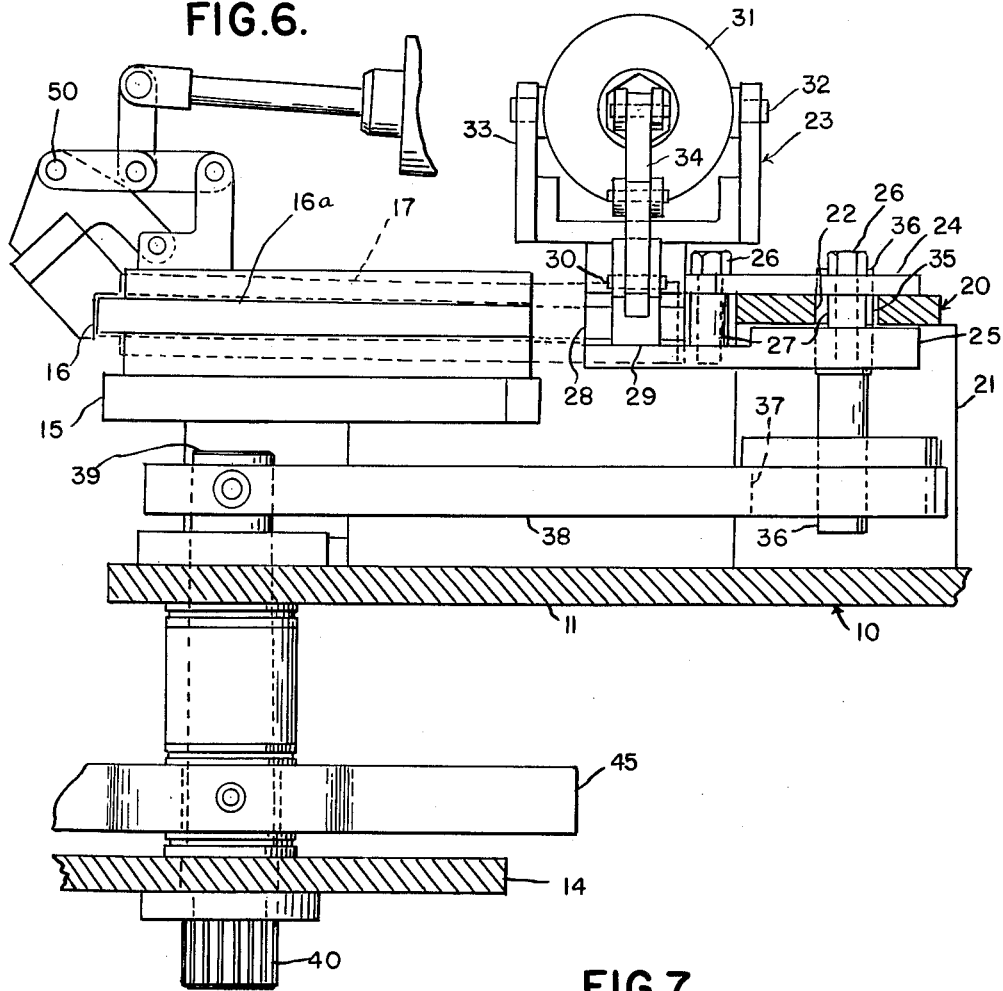
FIG. 6 is a fragmentary cross-sectional view of the machine taken substantially on the line 6—6 of FIG. 3.

The lower plate 25 carries a clamp mounting 28 which in conjunction with the plate 25 provides a form to which the end of the workpiece 17 is clamped by means of a jaw element 29 pivotally secured as at 30 to the mounting 28, as shown in FIGS. 2, 5 and 6. A hydraulic or pneumatic piston 31 is pivotally carried as at 32 in a frame 33 mounted on the mounting 28 and operates preferably through linkage 34 to open and close the jaw element 29 as shown in FIGS. 2 and 5 to securely seize the end of the workpiece 17 and retain same during the stretch forming operation of the machine.

A roller 35 is carried between the plates 24 and 25 on a pin 36 secured to the plates 24 and 25 and depending therefrom as shown in FIG. 6. The roller 35 rides on the side of the slot 22 and follows the contour thereof. The pin 36 extends through a vertical and longitudinally elongated slot 37 provided in the end of an arm 38 secured to a pivot shaft 39 extending down through the table 11 and the frame 14. One of the shafts 39 preferably has a splined end 40 adapted to be driven through a gear box 41 by a motor 42, the gear box 41 and motor 42 being preferably mounted on the platform 13 and connected by pulleys and belts 43 as illustrated in FIGS. 2 and 3.

Figure 4:
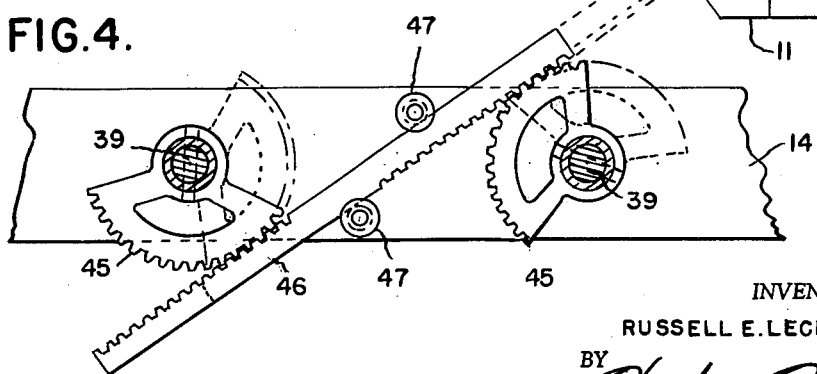
FIG. 4 is a view of the rack and gear mechanism of the machine taken on the line 4—4 of FIG. 2.

A gear segment 45 is secured to each shaft 39 near the frame 14, the two gear segments 45 being connected for simultaneous rotation by any means such as a rack 46 in the manner shown in FIG. 4, the rack 46 being supported and guided by any means such as rollers 47 pivotally carried by the frame 14.

A third clamping device 50, as illustrated in FIGS. 2, 3 and 6 and constructed substantially the same as the clamping devices 23, is preferably mounted intermediate the ends of the form 16 for clamping a substantially medial portion of the workpiece 17 directly to the form to prevent any lateral displacement of the workpiece 17 during the stretch forming operation.

Other equipment such as hydraulic punches 51 and the like may be mounted as desired to perform other operations on the workpiece. Such devices are more or less conventional and, not being a part of the present invention, a detailed description is omitted.

Figure 8:
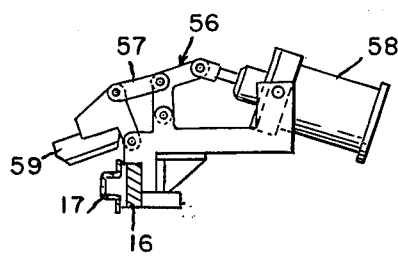
FIG. 8 is an elevational side view of a shearing device as adapted for use with the machine.
Figure 7:
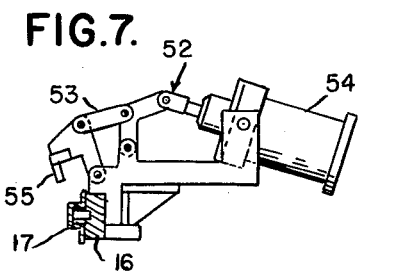
FIG. 7 is an elevational side view of a punch device as adapted for use with the machine.

Additional devices, such as those illustrated in FIGS. 7 and 8 may also be mounted on the form 16 at any convenient location. FIG. 7, for example, illustrates a preferred punch device 52, having linkage 53 and a hydraulic cylinder 54 substantially the same as are used for the clamping devices 23 and/or 50, except that a punch element 55 is used in place of a clamping jaw. FIG. 8 illustrates a preferred shearing device 56, having linkage 57 and a hydraulic cylinder 58 substantially the same as are used for the clamping devices 23 and/or 50, except that a parting knife 59 is used. The device 56 may replace the central clamping device 50, for shearing the workpiece 17 in the center, making right and left hand parts.

It will be noted that a shield 52 is preferably disposed at the front of the machine as shown in FIG. 1 for protection of the operator from the rack 46 and gears 45 described above. This shield is omitted from the other views for reasons of clarity.

In operation, a workpiece 17, in the present case being a channel-like strip, is placed in position on the form 16, its ends extending outward under the open jawed clamping devices 23 which are at the initial position shown in FIG. 1. The hydraulic cylinders 31 are actuated to clamp the workpiece ends to the mounting 28. The motor 42 is then started to drive the shafts 39 through the gearbox 41, one shaft 39 operating the other simultaneously through the rack 46 and gears 47. The arms 38 rotate toward the rear in a horizontal plane, moving the clamping devices 23 along the cam structure 20, the roller 35 following the slot 22 and the upper plate 24 following the upper cam surface. The workpiece 17 is thus bent around the form 16.

The cam structure 20 is so positioned that an increasing tension is applied to the workpiece 17 from one end to the other of each clamping device travel, effectively stretching those areas of the workpiece 17 having the larger radii to prevent crimping in those areas of smaller radii. The cam structure 20 also being sloped in conformance with the form slope or slopes, the workpiece 17 is given the desired shape. This complex forming and stretching is made possible by the fact that the clamping devices 23 are wholly carried by the cam structures 20 whose contours they follow, the pins 36 being slidable lengthwise of arms 38 in slots 37 and vertically slidable relative to the arms 38 which exert at all times the force necessary to move the clamping devices.

At the end of the stretch-forming operation, the clamping devices 23 release the workpiece, which is removed, and the motor 42 is reversed to restore the machine to its initial position. Any electrical and/or hydraulic system may be used for operating the machine, and limit switches if desired may be incorporated in conventional arrangement for starting and stopping.

Although I have described only one preferred embodiment of my invention, it will be apparent to one skilled in the art to which the invention pertains that various changes and modifications may be made therein without departing from the spirit of the invention or the scope of the appended claims.

I claim:

1. A stretch forming machine for bending workpieces and comprising a support, a convexly contoured form carried by said support, a cam structure carried by said support and radially spaced from said form, said cam structure having an arcuate cam surface and an upper cam surface substantially normal to said arcuate cam surface; a clamping device movably engaged with said cam surfaces and selectively operable to seize said workpiece, actuating means for selectively moving said clamping device along said cam structure between predetermined positions thereon, said arcuate cam surface being contoured relative to said form to produce increasing tension on said workpiece from end to end of clamping device travel to stretch said workpiece around said form, said clamping device being supported and carried at all times only by said cam structure and resting on top of said upper cam surface, said actuating means comprising an arm pivotally carried by said support and operably engaged with said clamping device, and means selectively pivoting said arm to move said clamping device along said cam, said clamping device being slidable lengthwise of said arm and movable toward and away from the plane in which said arm moves.

2. A stretch forming machine for bending workpieces and comprising a support, a convexly contoured form carried by said support, a cam structure carried by said support and radially spaced from said form, said cam structure having an arcuate cam surface and an upper cam surface substantially normal to said arcuate cam surface, a clamping device movably engaged with said cam surface and selectively operable to seize said workpiece, actuating means for selectively moving said clamping device along said cam structure between predetermined positions thereon, said cam structure being contoured relative to said form to produce increasing tension on said workpiece from end to end of clamping device travel to stretch said workpiece around said form, said clamping device being supported and carried at all times only by said cam structure and resting on top of said upper cam surface, said actuating means comprising an arm pivotally carried by said support and operably engaged with said clamping device, and means selectively pivoting said arm to move said clamping device along said cam, said form and said arcuate cam contours being substantially arcuate with respect to the pivot axis of said arm and said upper arm surface being sloped relative to a lateral plane extending normal to said pivot axis, said clamping device being relatively movable with respect to said arm in a direction normal to the aforesaid lateral plane to permit said clamping device during movement along said upper cam surfaces to freely follow the slope thereof while being engaged at all times with said arm.

3. A stretch forming machine for bending workpieces and comprising a support, a convexly contoured form carried by said support, a cam structure carried by said support and radially spaced from said form, said cam structure having an arcuate cam surface and an upper cam surface substantially normal to said arcuate cam surface, a clamping device movably engaged with said cam surfaces and selectively operable to seize said workpiece, actuating means for selectively moving said clamping device along said cam structure between predetermined positions thereon, said arcuate cam structure being contoured relative to said form to produce increasing tension on said workpiece from end to end of clamping device travel to stretch said workpiece around said form, said clamping device being supported and carried at all times only by said cam structure and resting on top of said upper cam surface, said actuating means being pivotally carried by said support and operably engaged with said clamping device, said form and said arcuate cam contours being substantially arcuate with respect to the pivot axis of said actuating means and said upper cam surface being sloped relative to a lateral plane extending normal to said pivot axis, said clamping device being relatively movable with respect to said actuating means in a direction normal to the aforesaid lateral plane to permit said clamping device during movement along said upper cam surface to follow the slope thereof while being engaged at all times with said actuating means.

4. A stretch forming machine for bending workpieces and comprising a support, a form carried by said support and having convexly contoured ends, a pair of cam structures carried by said support and respectively radially spaced from the ends of said form, said cam structures each having an arcuate cam surface and an upper cam surface substantially normal to said arcuate cam surface, a clamping device movably engaged with the cam surfaces of each of said cam structures and each operable to seize an end of a workpiece positioned adjacent said form, actuating means for selectively moving said clamping devices respectively along said cam structures between predetermined positions thereon, each arcuate cam surface being contoured respectively relative to the ends of said form to produce increasing tension on said workpiece from end to end of the clamping devices' travel to stretch said workpiece around the ends of said form, said clamping devices being respectively supported and carried at all times only by said cam structures and resting on top of said supper cam surfaces, said actuating means comprising a pair of actuators each pivotally carried by said support and respectively operably engaged with said clamping devices, means connecting said actuators for simultaneous operation, the ends of said form and said cam contours being respectively substantially arcuate with respect to the pivot axes of said actuators and said upper cam surfaces being sloped relative to a lateral plane extending normal to said pivot axes, said clamping devices being relatively movable with respect to said actuators in a direction normal to the aforesaid lateral plane to permit said clamping devices during movement along said upper cam surfaces to follow the slopes thereof while being respectively engaged at all times with said actuators.

5. A stretch forming machine for bending workpieces and comprising a support, a form carried by said support and having convexly contoured ends, a pair of cam structures carried by said support and respectively spaced from the ends of said form, a clamping device movably engaged with each of said cam structures and each operable to seize an end of a workpiece positioned adjacent said form, actuating means for selectively moving said clamping devices respectively along said cam structures between predetermined positions thereon, each cam structure being contoured respectively relative to the ends of said form to produce increasing tension on said workpiece from end to end of the clamping devices' travel to stretch said workpiece around the ends of said form, said clamping devices being respectively supported at all times by said cam structures, said actuators comprising a pair of arms pivotally carried by said support and respectively operably engaged with said clamping devices, means connecting said arms for simultaneous operation, and means selectively pivoting said arms to move said clamping devices simultaneously respectively along said cams, each of said arms being pivoted on a vertical axis and having a longitudinally extending vertical slot remotely spaced from said axis, the ends of said form and said cam contours being respectively arcuate with respect to the pivot axes of said arms and sloped with respect to a plane extending normal to said pivot axes, said clamping devices respectively overlying said arms and each having a depending pin engaged respectively with said slots in said arms for relative vertical and longitudinal sliding movement therein to permit said clamping devices during respective movement along said cams to follow the arcuate contours and slopes thereof.

References Cited in the file of this patent

UNITED STATES PATENTS

| 1,264,248 | Yoder | Apr. 30, 1918 |
| 1,461,471 | Bancroft | July 10, 1923 |
| 2,357,027 | Siefried | Aug. 29, 1944 |
| 2,369,515 | Amiot | Feb. 13, 1945 |
| 2,515,752 | Weightman | July 18, 1950 |
| 2,603,259 | Long | July 15, 1952 |
| 2,830,644 | Walker et al. | Apr. 15, 1958 |

FOREIGN PATENTS

| 482,769 | Great Britain | Apr. 5, 1938 |
| 507,683 | Belgium | Dec. 31, 1951 |